US007936855B2

(12) United States Patent
Lee et al.

(10) Patent No.: US 7,936,855 B2
(45) Date of Patent: May 3, 2011

(54) OVERSAMPLING DATA RECOVERY CIRCUIT AND METHOD FOR A RECEIVER

(75) Inventors: Tzuen-Hwan Lee, Hsinchu (TW); Shun-Yuan Hsiao, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 656 days.

(21) Appl. No.: 12/068,039

(22) Filed: Feb. 1, 2008

(65) Prior Publication Data

US 2008/0187080 A1 Aug. 7, 2008

(30) Foreign Application Priority Data

Feb. 2, 2007 (TW) .................................. 096103871

(51) Int. Cl.
*H04L 7/00* (2006.01)
*H04L 7/02* (2006.01)
*H04L 27/06* (2006.01)

(52) U.S. Cl. .................... 375/355; 375/360; 375/340

(58) Field of Classification Search .................. 375/354, 375/355, 359, 360, 371, 340; 327/91, 94
See application file for complete search history.

(56) References Cited

U.S. PATENT DOCUMENTS

| | | | | |
|---|---|---|---|---|
| 6,947,493 | B2 * | 9/2005 | Cohen et al. .................. 375/295 |
| 7,015,726 | B1 * | 3/2006 | Tayler et al. .................... 327/24 |
| 7,240,249 | B2 * | 7/2007 | Buchmann et al. ........... 714/700 |
| 2003/0068000 | A1 * | 4/2003 | Warren ......................... 375/355 |
| 2004/0037383 | A1 * | 2/2004 | Song ............................. 375/371 |
| 2006/0044022 | A1 * | 3/2006 | Tayler et al. .................... 327/24 |

* cited by examiner

*Primary Examiner* — Tesfaldet Bocure
(74) *Attorney, Agent, or Firm* — Jianq Chyun IP Office

(57) ABSTRACT

An oversampling data recovery circuit for a receiver comprises a plurality of sampling circuits for sampling an input data upon a plurality of clocks to generate a plurality of sample data, respectively, an edge detector for determining an edge of the input data by monitoring the plurality of sample data, and a state machine for selecting one from the plurality of sample data as an output data of the oversampling data recovery circuit according to the edge of the input data, such that the receiver will have an optimum timing margin.

9 Claims, 10 Drawing Sheets

US 7,936,855 B2

OVERSAMPLING DATA RECOVERY CIRCUIT AND METHOD FOR A RECEIVER

FIELD OF THE INVENTION

The present invention is related generally to a communication system and, more particularly, to an oversampling data recovery circuit and method for a receiver.

BACKGROUND OF THE INVENTION

A communication system typically has a transmitter and a receiver for communications therebetween. Because the transmitted signal may be distorted by environmental interferences, the receiver usually includes a data recovery circuit for recovering the data correctly. FIG. 1 shows a conventional data recovery circuit 100, which comprises a flip-flop 102 to sample the received data DIN. When the transmitter sends out the data DIN, a clock CLK is synchronously generated for the receiver, such that the data recovery circuit 100 can correctly recover the transmitted data DIN with the clock CLK. FIG. 2 shows one unit interval (UI) of the data DIN, and the arrow 104 indicates the rising edge of the clock CLK. The unit interval is also named bit time, and is the reciprocal of the data rate. As the data rate in an input/output (IO) bus increases, the UI will decrease. The receiver has a timing margin, and the timing margin will reduce as the data rate increases in the IO bus. The greater the timing margin is, the higher the stability of the communications between the transmitter and the receiver is. Ideally, as shown in FIG. 2, the available timing margin is equal to one UI.

However, the edge of the input data DIN may occur jittering during transmission due to unstable or undesirable transmission environment, and it also may occur skewing between the input data DIN and the clock CLK because the transmission delay time of the input data DIN is different from that of the clock CLK. FIG. 3 shows a condition that the edge of the input data DIN occurs jittering, FIG. 4 shows a condition that the clock CLK leads the input data DIN, in which the arrow 104 skews forward for a skew time Tskew, and FIG. 5 shows a condition that the input data DIN leads the clock CLK, in which the arrow 104 skews backward for a skew time Tskew. FIG. 6 shows an eye diagram, which is the superimposition of the waveforms of FIGS. 4 and 5. If the jittering factor is considered, as shown in FIG. 3, the receiver will have the timing margin $$Tm = UI - TJ, \quad [\text{Eq-1}]$$

where TJ is the jitter range. If the skewing factor is also taken into consideration, as shown in FIG. 6, after the interference of jittering and skewing is deducted, the timing margin becomes $$Tm = UI - TJ - 2Tskew. \quad [\text{Eq-2}]$$

As discussed above, when the data rate increases, the UI will reduce, thereby decreasing the timing margin Tm. An insufficient timing margin will bring unreliable communications between the transmitter and the receiver. For instance, when the data rate is 250 Mbits/s, the UI will be 4 ns. Assuming that TJ=1 ns and Tskew=1 ns, the timing margin Tm will be 1 ns according to the equation Eq-2. That is, when the data rate is 250 Mbits/s, the receiver can tolerate such jittering and skewing. However, when the data rate increases to 400 Mbits/s, the UI will reduce to 2.5 ns. According to the equation Eq-2, the timing margin Tm becomes −0.5 ns, which indicates that the receiver can't tolerate such jittering and skewing.

Conventionally, oversampling is introduced into communication systems to reduce the influence of the jittering and skewing. For details of oversampling process, readers are referred to U.S. Pat. Application Publication Nos. 2004/0005021, 2004/0022196 and 2004/0042577. However, conventional oversampling methods require very complex circuits, and higher cost accordingly.

Therefore, it is desired a low-cost oversampling data recovery circuit.

SUMMARY OF THE INVENTION

An object of the present invention is to provide a low-cost oversampling data recovery circuit and method for a receiver.

Another object of the present invention is to provide an oversampling data recovery circuit and method for increasing the timing margin of a receiver.

According to the present invention, an oversampling data recovery circuit for a receiver comprises three sampling circuits for sampling an input data upon three clocks to thereby produce three sample data, respectively. By monitoring the three sample data to determine an edge of the input data, one of the three sample data is selected for the receiver such that the receiver will have an optimum timing margin.

According to the present invention, an oversampling data recovery method for a receiver comprises sampling an input data upon three clocks to thereby produce three sample data, respectively, monitoring the three sample data to determine an edge of the input data, and selecting one of the three sample data for the receiver such that the receiver will have an optimum timing margin.

The oversampling data recovery circuit according to the present invention is sampler, and of lower cost accordingly.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
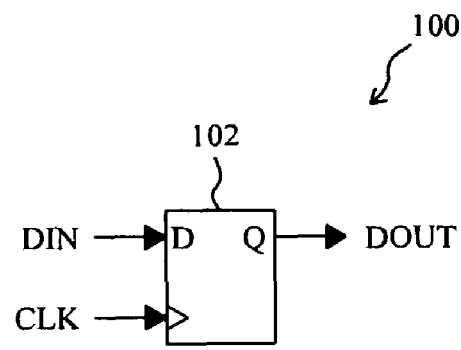
FIG. 1 shows a conventional data recovery circuit.
Figure 2:
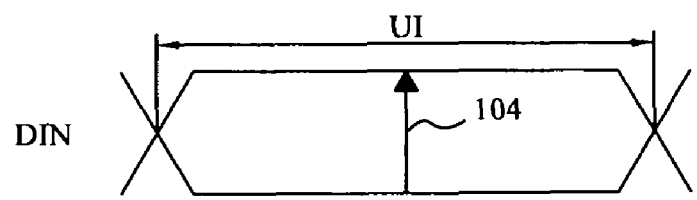
FIG. 2 shows one unit interval of an input data.
Figure 3:
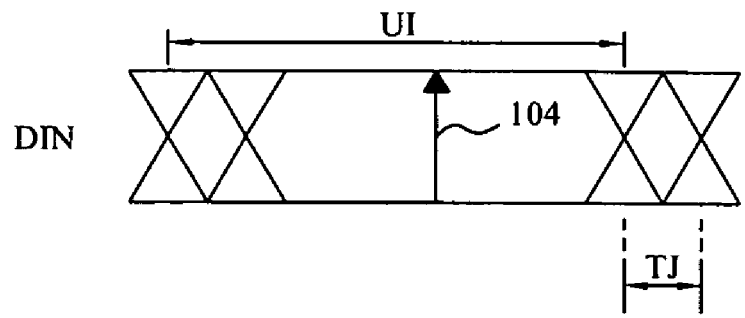
FIG. 3 shows a condition that the edge of an input data occurs jittering.
Figure 4:
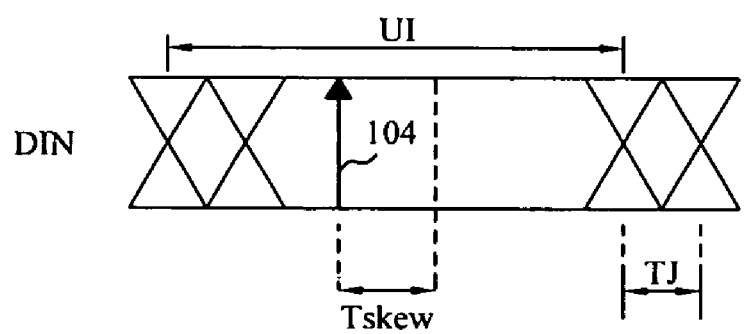
FIG. 4 shows a condition that a clock leads an input data.
Figure 5:
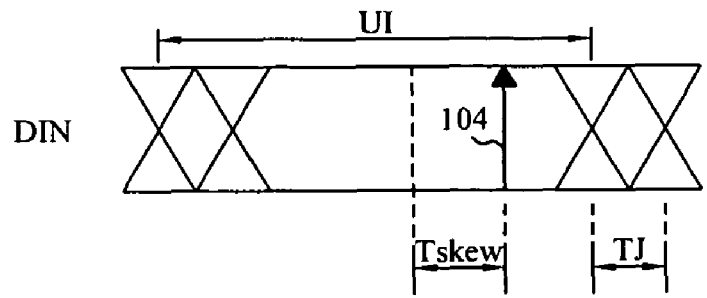
FIG. 5 shows a condition that an input data leads a clock.
Figure 6:
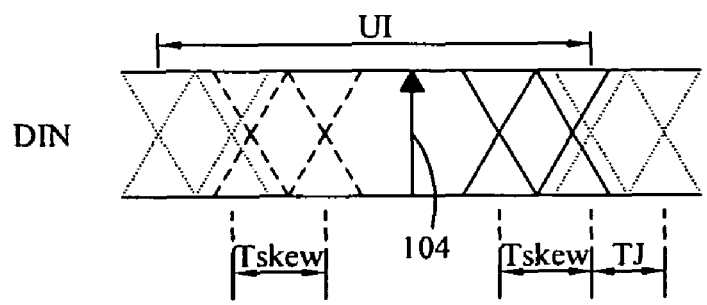
FIG. 6 shows an eye diagram by superimposing the waveforms of FIGS. 4 and 5.
Figure 7:
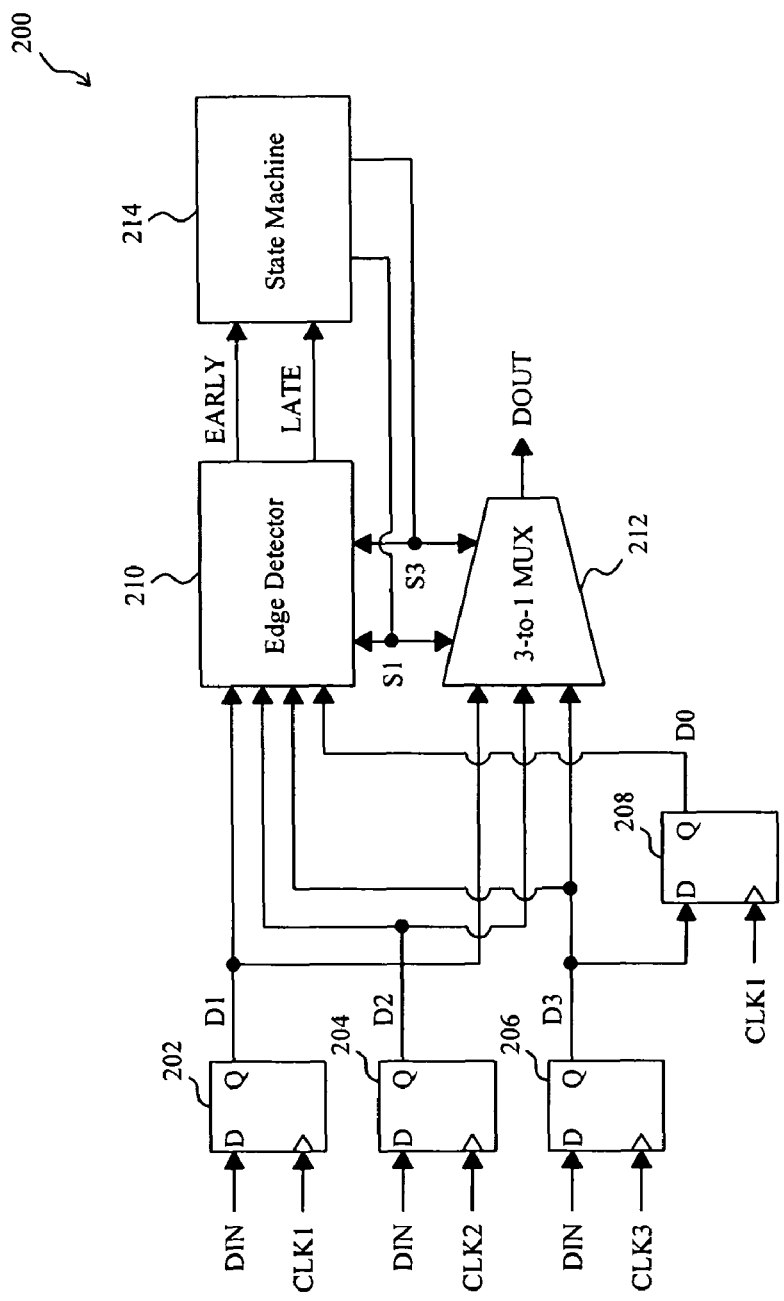
FIG. 7 shows an embodiment according to the present invention.

FIG. 7 shows an embodiment according to the present invention. In a triple oversampling data recovery circuit 200, a flip-flop 202 functions as a sampling circuit for sampling an input data DIN upon a clock CLK1 to thereby generate a sample data D1, a flip-flop 204 functions as a sampling circuit for sampling the input data DIN upon a clock CLK2 to thereby generate a sample data D2, a flip-flop 206 functions as a sampling circuit for sampling the input data DIN upon a clock CLK3 to thereby generate a sample data D3, the clock CLK1 leads the clock CLK2 for a time TD, the clock CLK2 leads the clock CLK3 for a time TD, a flip-flop 208 functions as a delay circuit for delaying the sample data D3 to thereby generate a sample data D0, an edge detector 210 determines an edge of the input data DIN by monitoring the sample data D0, D1, D2 and D3, a state machine 214 provides selection signals S1 and S3 to a multiplexer 212 according to the detection signals EARLY and LATE generated by the edge detector 210, and the multiplexer 212 selects one of the sample data D1, D2 and D3 to be an output DOUT according to the selection signals S1 and S3. Though the clock CLK1 is used for the flip-flop 208 in this embodiment, in other embodiments, the clock CLK2, CLK3 or another one may be used for the flip-flop 208 to produce a sample data with a delay time or a lead time.

Figure 8:
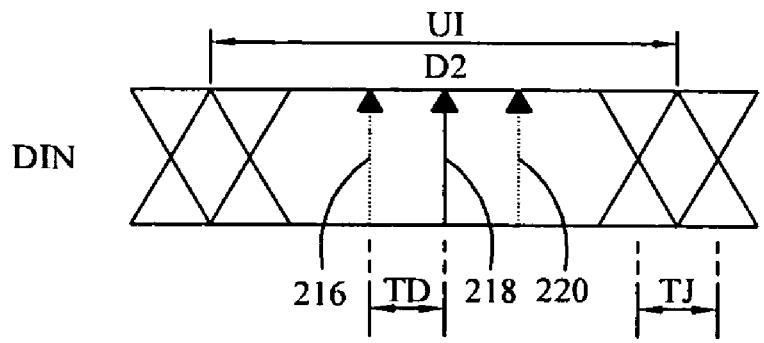
FIG. 8 shows a condition that the circuit of FIG. 7 samples an input data under consideration of jittering factor.
Figure 9:
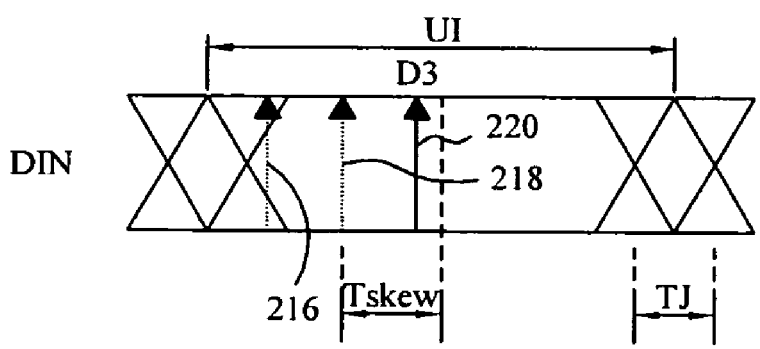
FIG. 9 shows a condition that the circuit of FIG. 7 samples an input data under consideration of jittering and skewing factors when the input data arrives lately.
Figure 10:
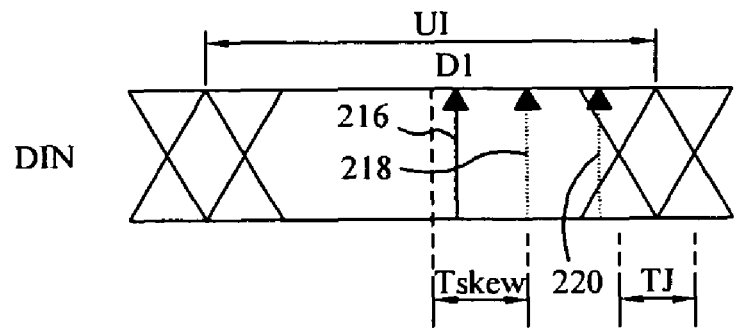
FIG. 10 shows a condition that the circuit of FIG. 7 samples an input data under consideration of jittering and skewing factors when the input data arrives early.
Figure 11:
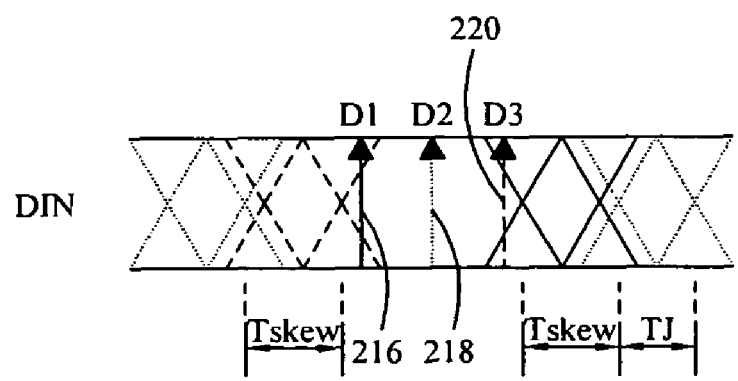
FIG. 11 shows an eye diagram by superimposing the waveforms of FIGS. 8, 9 and 10.

FIG. 8 shows a condition that the circuit 200 of FIG. 7 samples the input data DIN under consideration of jittering factor, in which the arrow 216 indicates the sampling point of the clock CKL1, the arrow 218 indicates the sampling point of the clock CKL2, and the arrow 220 indicates the sampling point of the clock CKL3. FIGS. 9 and 10 show two conditions that the circuit 200 of FIG. 7 samples the input data DIN under consideration of jitter and skew factors, of which FIG. 9 is for the input data DIN arriving lately, and FIG. 10 is for the input data DIN arriving early. The oversampling data recovery circuit 200 is so designed to select one from the three sample data D1, D2 and D3 according to the edge of the input data DIN, to obtain an optimum timing margin for a receiver. For example, without considering skewing factor, as shown in FIG. 8, the sampling point 218 with respect to the clock CLK2 has a best timing margin, and therefore the circuit 200 will select the sample data D2 to be the output DOUT for the receiver. On the other hand, considering skewing factor, if the input data DIN arrives lately, as shown in FIG. 9, the sampling point 220 with respect to the clock CLK3 has a best timing margin, and therefore the circuit 200 will select the sample data D3 to be the output DOUT for the receiver. Elsewhere, considering skewing factor, if the input data DIN arrives early, as shown in FIG. 10, the sampling point 216 with respect to the clock CLK1 has a best timing margin, and therefore the circuit 200 will select the sample data D1 to be the output DOUT for the receiver. FIG. 11 shows an eye diagram by superimposing the waveforms of FIGS. 8, 9 and 10, in which the dotted line represents the condition of FIG. 8, the dash line represents the condition of FIG. 9, and the solid line represents the condition of FIG. 10. From the eye diagram of FIG. 11, since the triple oversampling data recovery circuit 200 selects the most appropriate one from the sample data D1, D2 and D3, and the clocks CLK1 and CLK3 have a time difference 2TD therebetween, under considering jittering and skewing factors, the receiver using the triple oversampling data recovery circuit 200 can obtain an available timing margin $$Tm = UI - TJ - 2Tskew + 2TD. \quad [Eq-3]$$

Since the timing margin Tm increases, the circuit 200 is applicable to a higher speed IO bus.

In the triple oversampling data recovery circuit 200, the sample data D0 helps the edge determination of the input data DIN in some particular cases. For example, in the case of FIG. 8, if all the three sampling points are located between the edges of the input data DIN, resulting in the sample data D1, D2 and D3 all fail to be contributive to the edge determination of the input data DIN, the sample data D0 is used as a reference for facilitating the edge determination of the input data DIN.

Figure 12:
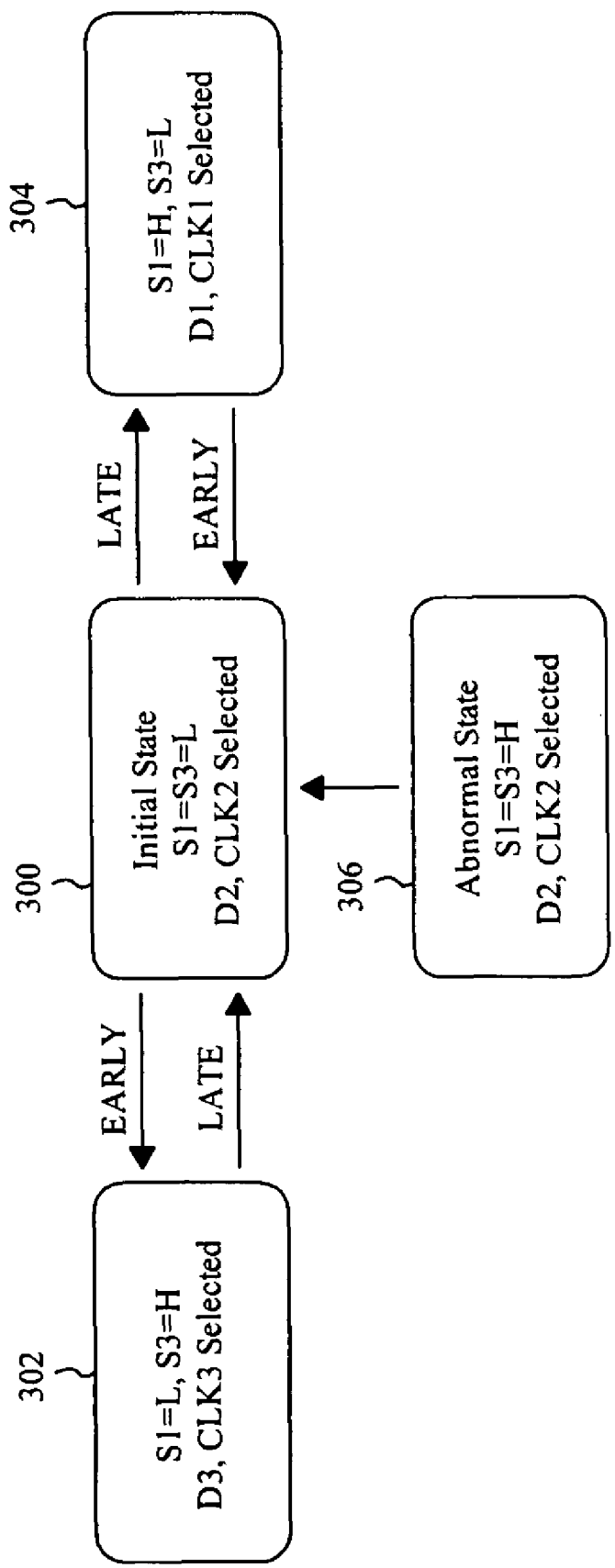
FIG. 12 shows a state diagram of the triple oversampling data recovery circuit of FIG. 7.

FIG. 12 shows a state diagram of the triple oversampling data recovery circuit 200. Four states are described in this embodiment, in which state 300 indicates that when the signals S1 and S2 are both at low level, the sample data D2 is selected as the output DOUT, state 302 indicates that when the signal S1 is low and the signal S3 is high, the sample data D3 is selected as the output DOUT, state 304 indicates that when the signal S1 is high and the signal S3 is low, the sample data D1 is selected as the output DOUT, and state 306 indicates that when both the signals S1 and S3 are at high level, the sample data D2 is selected as the output DOUT. In an initial state, the state 300 in FIG. 12, the signals S1 and S2 provided by the state machine 214 are both low, so that the output DOUT is identical to the sample data D2. Under the state 300, if the edge detector 210 detects that the edge of the input data DIN is located between the sample data D1 and D2, it generates a high-level signal EARLY so that the state machine 214 outputs a low-level signal S1 and a high-level signal S3, and then the multiplexer 212 selects the sample data signal D3 as the output DOUT and, at this time, the circuit 200 transits to the state 302 from the state 300. Under the state 300, if the edge detector 210 detects that the edge of the input data DIN is located between the sample data D2 and D3, it generates a high-level signal LATE so that the state machine 214 outputs a high-level signal S1 and a low-level signal S3, and then the multiplexer 212 selects the sample data D1 as the output DOUT and, at this time, the circuit 200 transits to the state 304 from the state 300. Under the state 302, if the edge detector 210 detects that the edge of the input data DIN is located between the sample data D0 and D1, it generates a high-level signal LATE so that the state machine 214 outputs low-level signals S1 and S3, and then the multiplexer 212 selects the sample data D2 as the output DOUT and, at this time, the circuit 200 transits to the state 300 from the state 302. Under the state 304, if the edge detector 210 detects that the edge of the input data DIN is located between the sample data D0 and D1, it generates a high-level signal EARLY so that the state machine 214 outputs low-level signals S1 and S3, and then the multiplexer 212 selects the sample data D2 as the output DOUT and, at this time, the circuit 200 transits to the state 300 from the state 304. When the signals S1 and S3 are both high, it indicates that the circuit 200 is now in an abnormal state 306, and at this time, the signals EARLY and LATE are both low, and the circuit 200 will be reset to the state 300. For other cases except for those described above, the circuit 200 shall stay in the current state.

Figure 13:
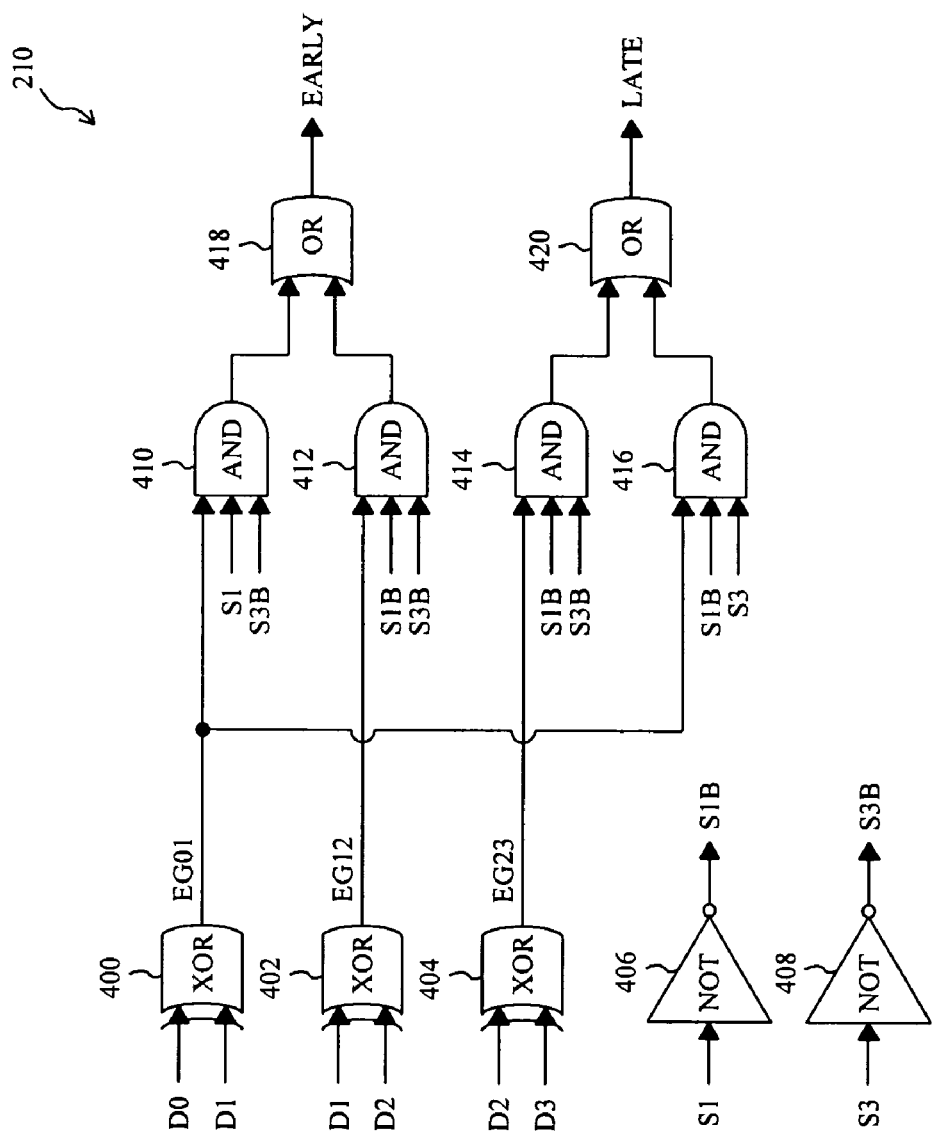
FIG. 13 shows an embodiment for the edge detector of FIG. 7.

FIG. 13 shows an embodiment for the edge detector 210 of FIG. 7, in which an exclusive-OR gate 400 generates a signal EG01 according to the sample data D0 and D1, an exclusive-OR gate 402 generates a signal EG12 according to the sample data D1 and D2, an exclusive-OR gate 404 generates a signal EG23 according to the sample data D2 and D3, the signal S1 is inverted into a signal S1B by an inverter 406, the signal S3 is inverted into a signal S3B by an inverter 408, an AND gate 410 outputs a signal to an OR gate 418 according to the signals EG01, S1 and S3B, an AND gate 412 outputs a signal to the OR gate 418 according to the signals EG12, S1B and S3B, an AND gate 414 outputs a signal to an OR gate 420 according to the signals EG23, S1B and S3B, an AND gate 416 outputs a signal to the OR gate 420 according to the signals EG01, S1B and S3, the OR gate 418 generates the signal EARLY according to the outputs of the AND gates 410 and 412, and the OR gate 420 generates the signal LATE according to the outputs of the AND gates 414 and 416.

Figure 14:
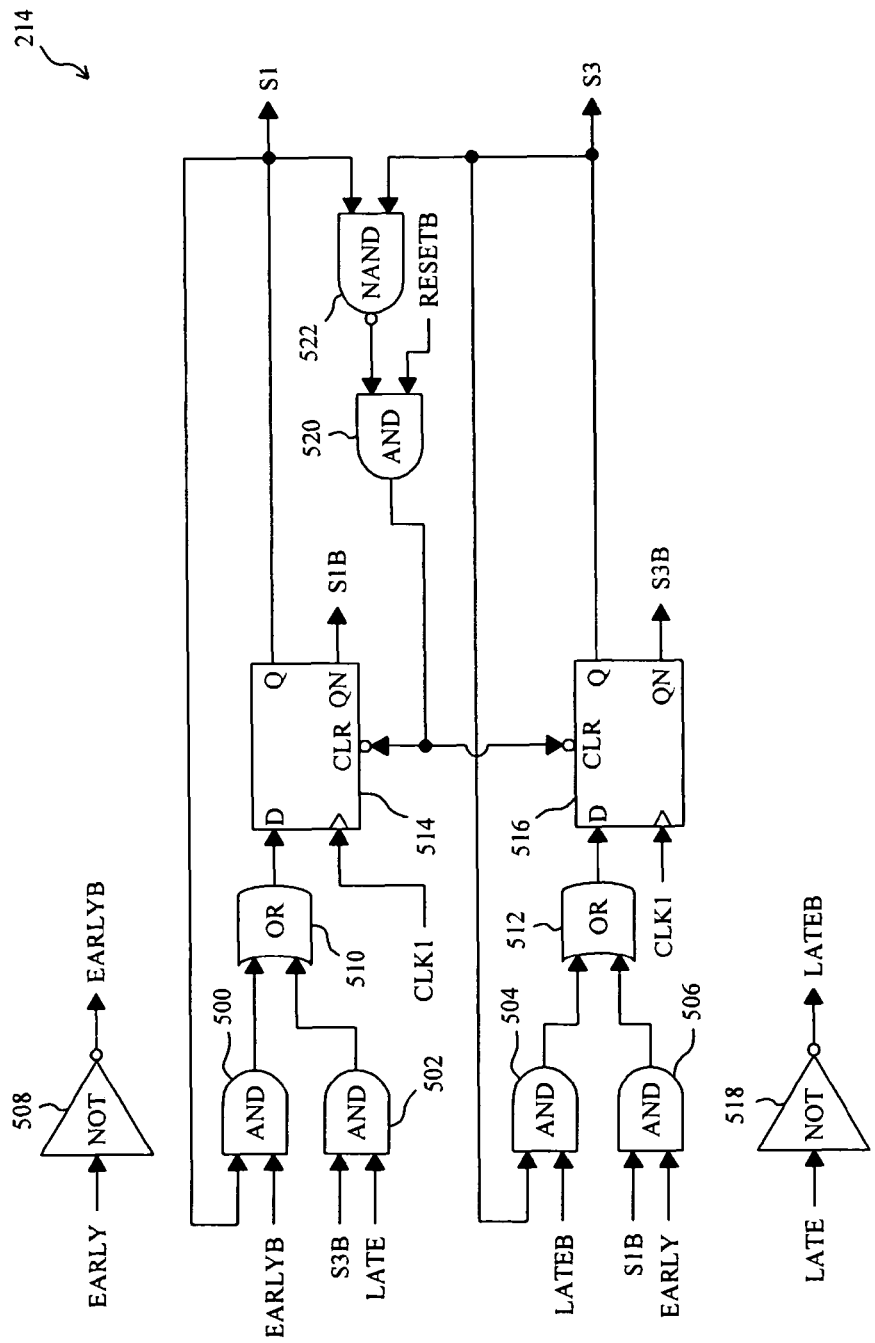
FIG. 14 shows an embodiment for the state machine of FIG. 7.

FIG. 14 shows an embodiment for the state machine 214 of FIG. 7, in which an inverter 508 inverts the signal EARLY into a signal EARLYB, an inverter 518 inverts the signal LATE into a signal LATEB, an AND gate 500 outputs a signal to an OR gate 510 according to the signals S1 and EARLYB, an AND gate 502 outputs a signal to the OR gate 510 according to the signals S3B and LATE, the OR gate 510 outputs a signal to an input D of a flip-flop 514 according to the outputs of the AND gates 500 and 502, the flip-flop 514 outputs the signals S1 and S1B according to the output of the OR gate 510 and the clock CLK1, an AND gate 504 outputs a signal to an OR gate 512 according to the signals S3 and LATEB, an AND gate 506 outputs a signal to the OR gate 512 according to the signals S1B and EARLY, the OR gate 512 outputs a signal to the input D of a flip-flop 516 according to the outputs of the AND gates 504 and 506, the flip-flop 516 outputs the signals S3 and S3B according to the output of the OR gate 512 and the clock CLK1, a NAND gate 522 outputs a signal to an AND gate 520 according to the signals S1 and S3, and the AND gate 520 generates a signal to reset the flip-flops 514 and 516 according to the output of the NAND gate 522 and a reset signal RESETB. Though the clock CLK1 is used for the inputs of the flip-flops 514 and 516 in this embodiment, in other embodiments, the clock CLK2, CLK3 or another clock may be used instead.

Figure 15:
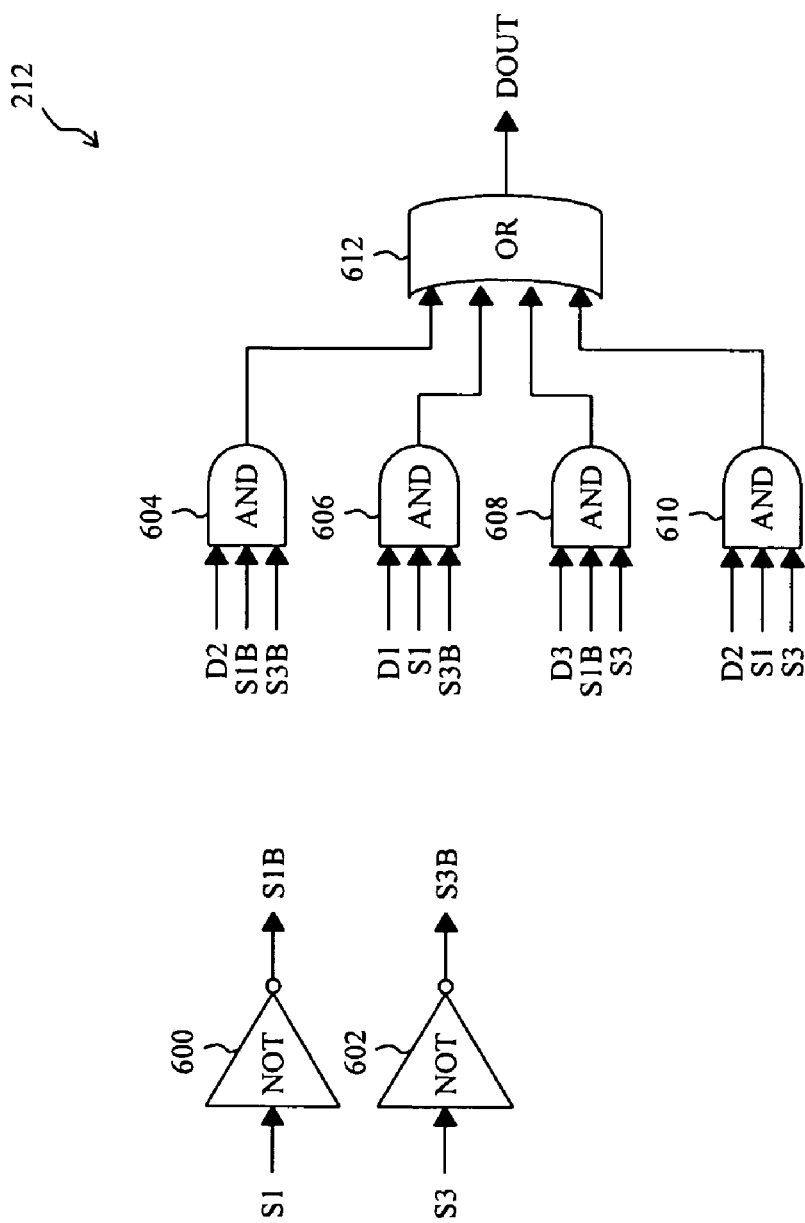
FIG. 15 shows an embodiment for the multiplexer of FIG. 7.

FIG. 15 shows an embodiment for the multiplexer 212 of FIG. 7, in which an inverter 600 inverts the signal S1 into the signal S1B, an inverter 602 inverts the signal S3 into the signal S3B, an AND gate 604 outputs a signal according to the sample data D2 and the signals S1B and S3B, an AND gate 606 outputs a signal according to the sample data D1 and the signals S1 and S3B, an AND gate 608 outputs a signal according to the sample data D3 and the signals S1B and S3, an AND gate 610 outputs a signal according to the sample data D2 and the signals S1 and S3, and an OR gate 612 generates the output DOUT according to the outputs of the AND gates 604, 606, 608 and 610.

Compared with conventional triple oversampling data recovery circuits, the triple oversampling data recovery circuit 200 according to the present invention uses less flip-flops and simple decision circuits, and thereupon, the circuit 200 is simpler and the cost is lower.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An oversampling data recovery circuit for a receiver, comprising:
   a first sampling circuit for sampling an input data upon a first clock to generate a first sample data;
   a second sampling circuit for sampling the input data upon a second clock to generate a second sample data;
   a third sampling circuit for sampling the input data upon a third clock to generate a third sample data;
   an edge detector, coupled to the first, the second and the third sampling circuits, for determining an edge of the input data by monitoring the first, second and third sample data, to thereby generate a detection signal;
   a state machine, coupled to the edge detector, for generating a selection signal in response to the detection signal; and
   a multiplexer, coupled to the first, the second and the third sampling circuits, the edge detector and the state machine, the multiplexer being used for selecting one of the first, second and third sample data onto an output data of the oversampling data recovery circuit according to the selection signal;
   wherein the first clock leads the second clock a first time and the second clock leads the third clock a second time.

2. The oversampling data recovery circuit of claim 1, wherein each of the first, second and third sampling circuits comprises a flip-flop for sampling the input data.

3. The oversampling data recovery circuit of claim 1, further comprising a delay circuit for delaying the third sample data to generate a fourth sample data.

4. The oversampling data recovery circuit of claim 3, wherein the delay circuit comprises a flip-flop for generating the fourth sample data.

5. The oversampling data recovery circuit of claim 3, wherein the edge detector comprises a logic circuit for generating the detection signal according to the first, second, third and fourth sample data and the selection signal.

6. The oversampling data recovery circuit of claim 5, wherein the state machine generates the selection signal according to the detection signal and the selection signal.

7. An oversampling data recovery method for a receiver, comprising the steps of:
   (a) sampling an input data upon a first clock, a second clock and a third clock for generating a first sample data, a second sample data and a third sample data, respectively, wherein the first clock leads the second clock a first time and the second clock leads the third clock a second time;
   (b) selecting one of the first, second and third sample data to be an output data as an initial state;
   (c) determining an edge of the input data by monitoring the first, second an third sample data;
   (d) selecting one of the first, second and third sample data to be the output data according to a current output data and the edge of the input data; and
   (e) repeating the step (c) to the step (d).

8. The method of claim 7, further comprising the step of delaying the first, second or third sample data for generating a fourth sample data.

9. The method of claim 8, wherein the step (d) comprises the steps of:
   selecting the third sample data to be the output data if the second sample data is the current output data and the edge of the input data is located between the first and second sample data;
   selecting the first sample data to be the output data if the second sample data is the current output data and the edge of the input data is located between the second and third sample data;
   selecting the second sample data to be the output data if the first sample data is the current output data and the edge of the input data is located between the first and fourth sample data;
   selecting the second sample data to be the output data if the third sample data is the current output data and the edge of the input data is located between the first and fourth sample data; and
   resetting to the initial state or remaining at the current state if the above conditions are not satisfied.

* * * * *